United States Patent [19]

Davis, Jr.

[11] 4,125,126

[45] Nov. 14, 1978

[54] PRESSURE AND VACUUM RELIEF VALVE

[76] Inventor: Roy F. Davis, Jr., P.O Box 634, Norwood, Minn. 55368

[21] Appl. No.: 781,578

[22] Filed: Mar. 28, 1977

[51] Int. Cl.² ............................................. F16K 17/18
[52] U.S. Cl. ................................. 137/493.1; 137/202; 137/528
[58] Field of Search .................. 137/202, 493.1, 493.2, 137/528, 529; 417/299

[56] References Cited

U.S. PATENT DOCUMENTS

| | | | |
|---|---|---|---|
| 2,574,414 | 11/1951 | Ragland | 137/528 X |
| 2,677,939 | 5/1954 | Clute | 137/202 X |
| 3,152,606 | 10/1964 | Vedder | 137/493.2 |
| 3,636,969 | 1/1972 | Jacobellis | 137/528 X |

FOREIGN PATENT DOCUMENTS 2,103,366  8/1972  Fed. Rep. of Germany ........... 137/528

Primary Examiner—Robert G. Nilson
Attorney, Agent, or Firm—Morton S. Adler

[57] ABSTRACT

A combination high pressure and vacuum relief valve to relieve excess pressure buildups and overload surges in gas and fluid flow lines, to release and break up any vacuum conditions which might develop in the opening and closing of flow in such lines, to serve as an air bleeder device to exhaust trapped air when the flow system is started up and to provide an air cushion against any slam or hammer action in the operation of the valve. A gravity operated vacuum breaker buoyant closure means is used with a pressure relief vented valve means operably connected to an air cylinder.

4 Claims, 5 Drawing Figures

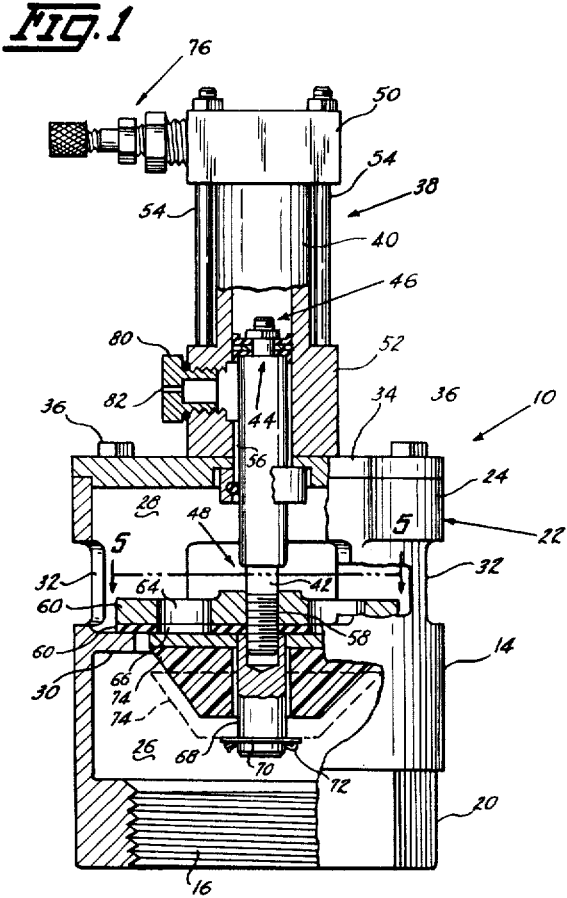
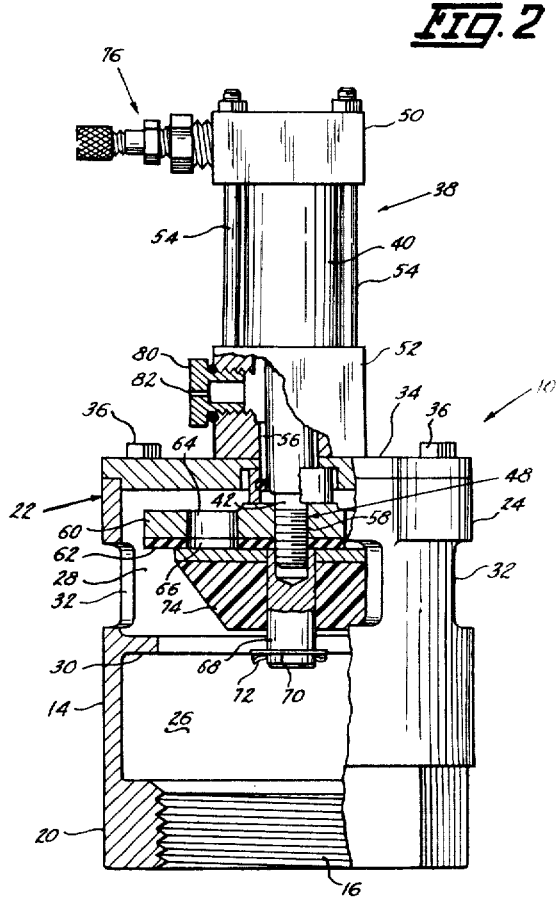
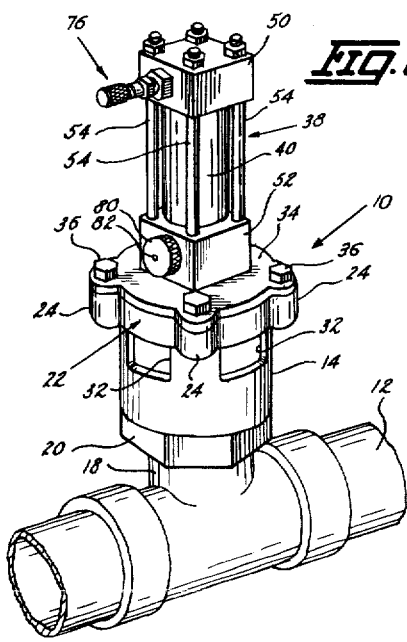
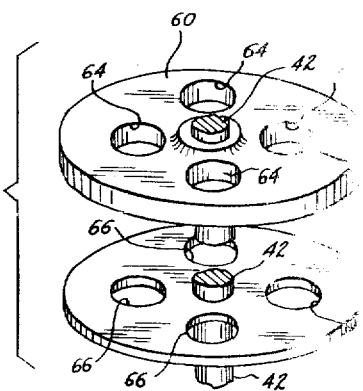

PRESSURE AND VACUUM RELIEF VALVE

BACKGROUND OF THE INVENTION

This invention relates to improvements in combination high pressure and vacuum relief valves and has particular utility in large irrigation systems.

Unexpected buildups of excess pressure and overload surges which develop in fluid flow lines such as found in irrigation systems can result in considerable damage including rupture of the line unless timely relieved. In addition, when the flow is periodically shut down and restarted, certain vacuum conditions are created which adversely effect the efficient operation of the entire system and the present invention is designed to accommodate such excess pressure and vacuum conditions when they arise.

The use of high pressure and vacuum relief valves are not new as exemplied by my own U.S. Pat. No. 3,766,941 which, like other valves having a similar purpose and function, traditionally employ various combinations of springs, levers, weights, diaphragms, air vents and the like in accomplishing their intended purpose. With the present invention which is particularly an improvement over my U.S. Pat. No. 3,766,941, one of the important objects is to provide a combination high pressure and vacuum relief valve wherein the operation of the valve is regulated solely by an air cylinder.

A further object herein is to provide a valve of the above class in which the valve itself is provided with vent means for vacuum relief purposes.

Still another object is to provide a valve as characterized which includes a novel gravity operated closure member for the vented valve that is responsive to pressures within the flow system in which the valve is used.

Yet another object herein is to provide an air intake and exhaust means associated with the air cylinder to cushion the movement of the valve against a slam reseating following an unseating under pressure developed in the flow system.

SUMMARY

The present valve includes a vertically disposed cylindrical valve housing mounted to a riser pipe attached to a horizontal flow line. The housing is divided into respective lower and upper chambers by an annular valve seat and the upper chamber is vented to the atmosphere. A cover plate for the housing carries an air cylinder which includes a reciprocating plunger rod to one of which is attached a valve seatable on the valve seat. The valve itself has apertures for vent purposes and a gravity operated buoyant closure is carried by the plunger rod below the valve for the purpose of opening and closing the vents therein.

Pressure limits on the air cylinder holding the valve closed will yield to higher pressures within the flow line to unseat the valve and vent such pressures to the atmosphere through the vents in the valve housing. Air vents in the valve are opened by gravity drop of the closure member when the valve is seated but no pressure exists in the flow line due to a shut down and permits bleeding of trapped air in the lower chamber to the atmosphere during the time the closure member rises and effects sealing engagement with the valve vents when the flow system is restarted.

A separate air intake and discharge port in the air cylinder below the plunger head permits air intake into the cylinder when the valve is unseating and rising and air discharge as the valve moves downwardly for reseating so as to provide an air cushion against a slam reseating movement. The air cylinder has a self-contained air supply but may be connected to an external source of air under pressure.

BRIEF DESCRIPTION OF THE DRAWINGS

FIG. 1 is a side elevational view of this combination pressure and vacuum relief valve partially broken away and partially in section to more clearly illustrate the valve in closed position, FIG. 2 is a view substantially similar to FIG. 1 showing the valve in open position, FIG. 3 is a reduced perspective view of this valve shown in relationship to a fragmentary portion of an irrigation pipe, FIG. 4 is a fragmentary perspective view of the upper end of the air cylinder showing the air intake modified for attachment to a continuous source of air under pressure, and FIG. 5 is an exploded perspective view of the valve disc and associated gasket taken from the line 5—5 of FIG. 1.

DESCRIPTION OF THE PREFERRED EMBODIMENTS

Referring to the drawings, this pressure and vacuum relief valve is designated generally by the numeral 10 and is illustrated in its preferred environmental use in FIG. 3 where it is shown mounted to a water supply line 12 that is part of an irrigation system. It will be understood that line 12 is associated with suitable pumping mechanism (not shown) and the purpose and function of valve 10 is to provide an improved, efficient, dependable and automatically operable pressure and vacuum relief for overload surges and pressures that may develop in line 12 as flow moves therethrough and is stopped and restartee from time to time. This new valve 10, as will appear, provides economy in manufacture and materially reduces maintenance requirements by eliminating the use of varied combinations of such parts as springs, weights, levers, diaphragms and the like usually found in devices of this type.

A cylindrical valve housing 14 has the internally threaded axial bore 16 in the lower end thereof adapted for threaded engagement with an upstanding riser pipe 18 secured to line 12 as shown and in communication with the interior thereof. To facilitate attaching housing 14 to pipe 18, the lower external surface of housing 14 is of hex shape 20 for receiving a suitable tightening tool in a well known manner.

The upper end 22 of housing 14 includes four equally spaced and vertically bored bolt support members 24 and such housing 14 is divided into the lower chamber 26 and the upper chamber 28 by the internally extending annular flange ring 30 which serves as a valve seat as will later appear. Intermediate flange 30 and top end 22, housing 14 is provided with a plurality of concentrically arranged openings or ports 32 providing the upper chamber 28 with communication to the atmosphere. Preferably, an opening 32 is formed between adjacent bolt supports 24. A cover plate 34, complementary in shape to top 22, is removably attached to such top by the bolts 36 which extend into the supports 24.

An air cylinder unit, for which no invention is claimed per se, is designated generally by the numeral 38 and is of a type that is commercially available in its basic construction and operation which I have adapted for this invention as will appear. Unit 38 includes the cylinder housing 40 in which the operating rod 42 is reciprocally mounted as best seen in FIG. 1 where one end portion 44 of rod 42 within housing 40 has the usual plunger head 46 and the other end portion 48 extends outwardly therefrom. The exterior upper and lower ends of housing 40 are encased in the respective caps 50 and 52 which are secured together by the elongated bolt and nut means 54 that are also used for mounting unit 38 to the cover plate 34 in the position shown in FIGS. 1, 2 and 3. By this arrangement, end portion 48 of rod 42 extends through the axial opening 56 in cover plate 34 into housing 14.

The end of rod portion 48 is externally threaded as at 58 to receive the disc valve 60 which has the complementary shaped gasket 62 of rubber or the like secured to the underside thereof and positioned so as to be capable of sealing engagement against the top of seat 30 as best seen in FIG. 1 Valve 60 and gasket 62 are provided with the respective registering air vent ports or openings 64 and 66.

A sleeve member 68 is secured to end portion 48 of rod 42 as an extension thereof below gasket 62 and at the extended or free end of sleeve 68, there is provided a washer 70 maintained by the cotter pin 72. Intermediate washer 70 and gasket 62, a buoyant closure member 74 is slidably arranged on sleeve 68 and is capable of moving into and out of sealing engagement with the vents 64 and 66 as will be more fully described in the operation of this valve.

With reference again to the air cylinder unit 38 as seen in FIGS. 1, 2 and 3, I have preferably modified it for purposes here as follows. Associated with the upper end of unit 38 as shown, I have mounted an automobile type air valve 76 through cap 50 whereby unit 38 can be self-contained as to air pressure within predetermined limits and this can be utilized to advantage in a valve of this type which may be used in a field environment where sources of air under pressure are not conveniently available. However, where such sources are available, unit 38 may be connected to a fixed source of supply by way of a compressor (not shown) or otherwise as illustrated by the air intake connection means 78 shown in FIG. 4.

A further modification in unit 38 is the provision of the cap nut 80, mounted to cap 52, which provided with the through opening or air passageway 82 of approximately one thirty second of an inch diameter that communicates with the interior of air cylinder housing 40 below the plunger head 44.

OPERATION

With this valve 10 constructed as described, it will operate in the following manner. While air cylinders such as unit 38 may be constructed to maintain varied limits of pressure, I have found that for purposes here, a cylinder capable of holding a pressure up to 250 PSI is adequate. Accordingly, with unit 38 thus pressured, the closed position of valve 10 as shown in FIG. 1 is maintained when any pressure that may be in chamber 26 is less than that exerted by cylinder 38 so that the valve 60 and gasket 62 are seated on valve seat 30. If the flow through pipe 12 is shut down so that chamber 26 is free of pressure and fluid, the closure member 74 will drop by gravity to its dotted line position shown in FIG. 1 where it will be apparent that it is out of closure engagement with the vents 66 and 64 in gasket 62 and valve 60.

Thereafter, when the flow system is restarted and fluid and pressure enter chamber 26, air that would otherwise be trapped in such chamber, is provided an avenue of escape through vents 66 and 64 and out of chamber 28 through openings 32 to the atmosphere during the time that closure 74 is being moved by pressure or fluid or both into its solid line position in FIG. 1 where it sealably engages vents 66 and correspondingly seals vents 64.

The closed position of the valve 60 is normally maintained by the air cylinder unit 38 as described and the closed position of closure 76 is maintained by normal pressures and fluid in chamber 26 when the flow system is in operation. However, should the pressure in chamber 26 exceed that for which cylinder unit 38 is limited, valve 60 together with closure 76 will rise to unseat valve 60 (FIG. 2) permitting pressure to escape into chamber 28 and out of openings 32 to the atmosphere. This, as may be appreciated, may be only momentarily and as soon as pressure in chamber 26 is relieved, cylinder 38 will return valve 60 to its closed position. To avoid a slam action return of valve 60, I have provided the vented cap 80 as described whereby air is drawn through passageway 82 into cylinder housing 40 below the plunger head 46 as valve 60 moves upwardly and is dispelled through said passageway as valve 60 moves downwardly. The restricted passageway 82 in effect meters the movement of air outwardly sufficiently so that such air serves as a cushioning means in the reseating of valve 60. Accordingly, from all of the foregoing, it is thought that a full and complete understanding of the construction and operation of this valve will be had and its advantages appreciated.

I claim:

1. A high pressure and vacuum relief valve, comprising:
   a valve housing having one end adapted for attachment to a fluid flow line and including a removable cover on the opposite end,
   a valve seat within said valve housing serving to divide said valve housing into a first chamber in communication with said flow line and a second chamber provided with vent means to the atmosphere,
   a valve member disposed within said valve housing and adapted for sealing engagement with said valve seat,
   said valve member being provided with an air vent affording communication between said first and second chambers,
   a closure member,
   means for slidably supporting said closure member within said valve housing intermediate said valve member and said flow line so that it is capable of moving into and out of sealing engagement with said air vent,
   said closure member adapted to move by gravity out of sealing engagement with said air vent when said valve member is seated and said flow line is shut down and upon the starting up of said flow line and the introduction of pressure and fluid into said first chamber from said flow line, air trapped in said first chamber is provided an avenue of escape through said air vent in said seated valve to said second chamber and to the atmosphere during the time said closure member is moved to its sealing engagement with said valve member by pressure or fluid,
   a source of air under pressure, means for operably connecting said source of air under pressure to said valve member to normally hold said valve member in sealing engagement with said valve seat, and when pressure in said first chamber from said flow line exceeds that provided by said source of air under pressure, said valve member being moved thereby out of engagement with said valve seat whereby pressure in said first chamber passes into said second chamber and is vented to the atmosphere through said vent means therein.

2. A high pressure and vacuum relief valve, comprising:

a valve housing having a top and bottom end with the bottom end adapted for attachment to a fluid flow line so as to communicate with the interior thereof, an annular valve seat within said valve housing serving to divide said valve housing into a lower chamber and an upper chamber, said housing being provided with an air port affording said upper chamber communication with the atmosphere, a cover plate detachable secured to the upper end of said valve housing, a valve member disposed within said valve housing and adapted for sealing engagement with said valve seat, said valve member being provided with an air vent affording communication between said lower and upper chambers, a closure member, means for slidably supporting said closure member within said valve housing below said valve member where it is capable of moving to an upper position into sealing engagement with said air vent and to a lower position out of sealing engagement therewith, said closure member moving by gravity to its lower position with said valve member seated and said flow line is shut down and upon the starting up of said flow and the introduction of pressure and fluid into said lower chamber from said flow line, air trapped in said lower chamber is provided an avenue of escape through said air vent in said seated valve to said upper chamber and to the atmosphere during the time said closure member is moved to its sealing engagement position with said valve member by pressure or fluid, a source of air under pressure, means for operably connecting said source of air under pressure to said valve member to normally hold said valve member in sealing engagement with said valve seat, and when pressure in said lower chamber from said flow line exceeds that provided by said source of air under pressure, said valve member being moved thereby out of engagement with said valve seat whereby pressure in said lower chamber passes into said upper chamber and is vented to the atmosphere through said air port.

3. A high pressure and vacuum relief valve, comprising:

a valve housing having a top and bottom end with the bottom end adapted for attachment to a fluid flow line so as to communicate with the interior thereof, an annular valve seat within said valve housing serving to divide said valve housing into a lower chamber and an upper chamber, said housing being provided with an air port affording said upper chamber communication with the atmosphere, a cover plate detachably secured to the upper end of said valve housing, an air cylinder secured to said cover plate, a valve member operably secured to said air cylinder and adapted for sealing engagement with said valve seat, said valve member being provided with an air vent affording communication between said lower and upper chambers, a closure member, means operably associated with said air cylinder for slidably supporting said closure member within said valve housing below said valve member where it is capable of moving to an upper position into sealing engagement with said air vent and to a lower position out of sealing engagement therewith, said closure member moving by gravity to its lower position with said valve member seated and said flow line is shut down and upon the starting up of said flow line and the introduction of pressure and fluid into said lower chamber from said flow line, air trapped in said lower chamber is provided an avenue of escape through said air vent in said seated valve to said upper chamber and to the atmosphere during the time said closure member is moved to its sealing engagement position with said valve member by pressure or fluid, means for pressurizing said air cylinder at predetermined selected limits to normally hold said valve member in sealing engagement with said valve seat, and when pressure in said lower chamber from said flow line exceeds that in said air cylinder, said valve member being moved thereby out of engagement with said valve seat whereby pressure in said lower chamber passes into said upper chamber and is vented to the atmosphere through said air port.

4. A high pressure and vacuum relief valve, comprising:

a valve housing having a top and bottom end with the bottom end adapted for attachment to a fluid flow line so as to communicate with the interior thereof, an annular valve seat within said valve housing serving to divide said valve housing into a lower chamber and an upper chamber, said housing being provided with an air port affording said upper chamber communication with the atmosphere, a cover plate detachably secured to the upper end of said valve housing, an air cylinder secured to said cover plate, a reciprocating rod in said air cylinder including a plunger head end portion within said air cylinder and an external end portion extended into said valve housing, a valve member secured to said external end portion and adapted for sealing engagement with said valve seat, a closure member slidably disposed on said external end portion below said valve member, said air cylinder being provided with a restricted air passageway communicating with the interior of said air cylinder at a point intermediate said plunger head and said valve member whereby when said valve member is unseated and the plunger head rises, air is drawn into said air cylinder through said air passageway and when said plunger head moves downwardly under pressure in said air cylinder to reseat said valve member, air drawn into said air cylinder is expelled through said air passageway in a manner that provides an air cushion on said plunger head against a slam reseating of said valve member, means for pressurizing said air cylinder at predetermined selected limits to normally hold said valve member in sealing engagement with said valve seat, and when pressure in said lower chamber from said flow line exceeds that in said air cylinder, said valve member being moved thereby out of engagement with said valve seat whereby pressure in said lower chamber passes into said upper chamber and is vented to the atmosphere through said air port.

* * * * *